United States Patent
Minatsuki et al.

(10) Patent No.: US 9,959,945 B2
(45) Date of Patent: May 1, 2018

(54) HIGH TEMPERATURE GAS COOLED REACTOR STEAM GENERATION SYSTEM

(71) Applicant: MITSUBISHI HEAVY INDUSTRIES, LTD., Tokyo (JP)

(72) Inventors: Isao Minatsuki, Tokyo (JP); Yorikata Mizokami, Tokyo (JP); Sunao Oyama, Tokyo (JP); Hiroki Tsukamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 769 days.

(21) Appl. No.: 14/350,946

(22) PCT Filed: Oct. 12, 2012

(86) PCT No.: PCT/JP2012/076513
§ 371 (c)(1),
(2) Date: Apr. 10, 2014

(87) PCT Pub. No.: WO2013/054913
PCT Pub. Date: Apr. 18, 2013

(65) Prior Publication Data
US 2015/0162105 A1    Jun. 11, 2015

(30) Foreign Application Priority Data

Oct. 14, 2011 (JP) ................. 2011-227459

(51) Int. Cl.
*G21C 1/12* (2006.01)
*G21C 15/253* (2006.01)
(Continued)

(52) U.S. Cl.
CPC ............ *G21C 15/18* (2013.01); *F22B 35/004* (2013.01); *G21C 1/09* (2013.01); *G21C 1/10* (2013.01);
(Continued)

(58) Field of Classification Search
CPC ... G21C 1/09; G21C 1/10; G21C 1/12; G21C 15/24; G21C 15/253; G21D 1/006;
(Continued)

(56) References Cited

U.S. PATENT DOCUMENTS 3,255,084 A * 6/1966 Doroszlai ................ G21D 3/10
165/104.25
3,894,394 A * 7/1975 Braytenbah ............... F01K 7/24
376/211
(Continued)

FOREIGN PATENT DOCUMENTS

GB          984692 A     3/1965
JP          57-582 A     1/1982
(Continued)

OTHER PUBLICATIONS

Nonbol, E., "Description of the Advanced Gas Cooled Type of Reactor (AGR)," NKS/RAK2(96)TR-C2. (Year: 1996).*
(Continued)

*Primary Examiner* — Sharon M Davis
(74) *Attorney, Agent, or Firm* — Westerman, Hattori, Daniels & Adrian, LLP

(57) ABSTRACT

A high temperature gas cooled reactor steam generation system (1) includes a nuclear reactor (2) that has helium gas as a primary coolant and heats the primary coolant by heat generated by a nuclear reaction that decelerates neutrons by a graphite block, a steam generator (3) that has water as a secondary coolant and heats the secondary coolant by the primary coolant via the nuclear reactor (2) to generate steam, a steam turbine (4) that is operated by the steam from the steam generator (3), and a generator (5) that generates electricity according to an operation of the steam turbine (4). Moreover, the system (1) includes pressure adjustment means for setting a pressure of the secondary coolant in the
(Continued)

steam generator (3) to be lower than a pressure of the primary coolant in the nuclear reactor (2).

11 Claims, 8 Drawing Sheets

(51) Int. Cl.

| | | |
|---|---|---|
| *F22B 35/00* | (2006.01) | |
| *G21C 15/18* | (2006.01) | |
| *G21D 3/08* | (2006.01) | |
| *G21D 3/04* | (2006.01) | |
| *G21C 9/00* | (2006.01) | |
| *G21C 1/09* | (2006.01) | |
| *G21D 1/00* | (2006.01) | |
| *G21D 1/04* | (2006.01) | |
| *G21C 1/10* | (2006.01) | |
| *G21C 15/28* | (2006.01) | |

(52) U.S. Cl.
CPC ............... *G21C 1/12* (2013.01); *G21C 9/00* (2013.01); *G21C 15/253* (2013.01); *G21D 1/006* (2013.01); *G21D 1/04* (2013.01); *G21D 3/04* (2013.01); *G21D 3/08* (2013.01); *G21C 15/28* (2013.01); *Y02E 30/33* (2013.01)

(58) Field of Classification Search
CPC .. G21D 1/04; G21D 3/04; G21D 3/14; G21D 3/08; G21D 5/08; G21D 5/12; F22B 1/1823; F22B 35/004; F22B 35/104; F22B 35/18
USPC .......................................................... 376/383
See application file for complete search history.

(56) References Cited

U.S. PATENT DOCUMENTS

| | | | |
|---|---|---|---|
| 4,976,913 A | 12/1990 | Schoessow | |
| 5,114,667 A | 5/1992 | Hayashi et al. | |
| 2004/0042579 A1* | 3/2004 | Bolton | F02C 1/05 376/383 |

FOREIGN PATENT DOCUMENTS

| | | |
|---|---|---|
| JP | 62-199698 U | 12/1987 |
| JP | 3-221893 A | 9/1991 |
| JP | 7-120575 A | 5/1995 |
| JP | 8-338892 A | 12/1996 |
| JP | 9-33681 A | 2/1997 |
| JP | 2011-226990 A | 11/2011 |
| WO | 03/046929 A2 | 6/2003 |

OTHER PUBLICATIONS

Notification Concerning Transmittal of International Preliminary Report on Patentability (Form PCTIB/326) of International Application No. PCT/JP2012/076513 dated Apr. 24, 2014 with Forms PCT/IB/373 and PCT/ISA/237 (6 pages).
International Search Report dated Nov. 20, 2012 issued in corresponding application No. PCT/JP2012/076513.
Written Opinion of the Searching Authority dated Nov. 20, 2012 issued in corresponding application No. PCT/JP2012/076513.
Communication under Rule 71(3) EPC dated Aug. 29, 2016, issued in counterpart European Patent Application No. 12839477.2 (50 pages).
Extended European Search Report dated May 15, 2015, issued in corresponding European application No. 12839477.2, (6 pages).
Decision to Grant a Patent dated Jun. 30, 2015, issued in counterpart Japanese patent application No. 2011-227459, with English translation (3 pages).

* cited by examiner

HIGH TEMPERATURE GAS COOLED REACTOR STEAM GENERATION SYSTEM

TECHNICAL FIELD

The present invention relates to a steam generation system using a high temperature gas cooled reactor.

BACKGROUND ART

For example, in the related art, a helium cooling high temperature gas cooled reactor disclosed in PTL 1 is a gas-cooled reactor that has helium gas as a coolant, in which a primary helium circuit including a nuclear reactor and a secondary helium circuit including an intermediate heat exchanger and a helium turbine are divided, heat in the primary helium circuit operates the helium turbine in the secondary helium circuit, and thus, electricity is generated.

CITATION LIST

Patent Literature

[PTL 1] Japanese Unexamined Patent Application Publication No. 8-338892

SUMMARY OF INVENTION

Technical Problem

In PTL 1, helium gas is used as the coolant of a secondary cooling system. However, there is a high temperature gas cooled reactor steam generation system in which water is used as the coolant of the secondary cooling system, steam is generated by a steam generator using heat of a primary helium circuit, a steam turbine is operated by the steam, and thus, electricity is generated.

In the high temperature gas cooled reactor steam generation system, in general, a steam pressure in the steam generator is set to be higher than a helium gas pressure in the nuclear reactor. Accordingly, when a heat transfer tube of the steam generator is damaged, there is a concern that high pressure water or steam supplied into the heat transfer tube may enter the nuclear reactor. In the high temperature gas cooled reactor steam generation system, a water entering suppression device is installed, and thus, water or steam entering into the nuclear reactor is prevented. However, when the water entering suppression device is not operated, graphite configuring a reactor core and water react ($C+H_2O \rightarrow CO+H_2$), and there is a concern that a hydrogen explosion due to corrosion of the graphite or flammable gas may occur.

The present invention is to solve the above-described problems, and an object thereof is to provide a high temperature gas cooled reactor steam generation system capable of preventing a secondary coolant in a steam generator from entering a nuclear reactor.

Solution to Problem

In order to achieve the above-described object, there is provided a high temperature gas cooled reactor steam generation system including: a nuclear reactor that has helium gas as a primary coolant and heats the primary coolant by heat generated by a nuclear reaction that decelerates neutrons by a graphite block; a steam generator that has water as a secondary coolant and heats the secondary coolant by the primary coolant via the nuclear reactor to generate steam; a steam turbine that is operated by the steam from the steam generator; a generator that generates electricity according to an operation of the steam turbine; and pressure adjustment means for setting a pressure of the secondary coolant in the steam generator to be lower than a pressure of the primary coolant in the nuclear reactor.

According to the high temperature gas cooled reactor steam generation system, since the pressure of the secondary coolant in the steam generator is set to be lower than the pressure of the primary coolant in the nuclear reactor by the pressure adjustment means, when a heat transfer tube of the steam generator is damaged, it is possible to prevent high pressure water or steam supplied into the heat transfer tube from entering the nuclear reactor.

In addition, in the high temperature gas cooled reactor steam generation system of the present invention, the pressure adjustment means may include a primary coolant storage unit that recovers or supplies the primary coolant, and may supply the primary coolant to the primary coolant storage unit.

According to the high temperature gas cooled reactor steam generation system, the pressure of the secondary coolant in the steam generator can be set to be lower than the pressure of the primary coolant in the nuclear reactor.

Moreover, in the high temperature gas cooled reactor steam generation system of the present invention, the pressure adjustment means may include a secondary coolant discharging unit that discharges the secondary coolant to the steam generator, and may decrease a discharging amount of the secondary coolant in the secondary coolant discharging unit.

According to the high temperature gas cooled reactor steam generation system, the pressure of the secondary coolant in the steam generator can be set to be lower than the pressure of the primary coolant in the nuclear reactor.

In addition, in the high temperature gas cooled reactor steam generation system of the present invention, the pressure adjustment means may include a secondary coolant flow rate variable unit that changes a flow rate of the secondary coolant fed to the steam turbine, and may increase the flow rate of the secondary coolant fed to the steam turbine in the secondary coolant flow rate variable unit.

According to the high temperature gas cooled reactor steam generation system, the pressure of the secondary coolant in the steam generator can be set to be lower than the pressure of the primary coolant in the nuclear reactor.

Moreover, in the high temperature gas cooled reactor steam generation system of the present invention, the pressure adjustment means may include a secondary coolant bypass flow rate variable unit that is provided at a bypass circuit bypassing the secondary coolant to the steam turbine and changes the flow rate of the secondary coolant, and may increase the flow rate of the secondary coolant fed to the bypass circuit in the secondary coolant bypass flow rate variable unit.

According to the high temperature gas cooled reactor steam generation system, the pressure of the secondary coolant in the steam generator can be set to be lower than the pressure of the primary coolant in the nuclear reactor.

In addition, the high temperature gas cooled reactor steam generation system of the present invention may further include pressure control means for controlling the pressure adjustment means so that, based on a pressure difference between the pressure of the primary coolant and the pressure of the secondary coolant, the pressure difference is within a predetermined range.

According to the high temperature gas cooled reactor steam generation system, based on the pressure difference between the pressure of the primary coolant and the pressure of the secondary coolant, the pressure of the secondary coolant in the steam generator can be set to be controlled to be lower than the pressure of the primary coolant in the nuclear reactor by the pressure adjustment means.

Moreover, the high temperature gas cooled reactor steam generation system of the present invention may further include temperature adjustment means for increasing an outlet temperature of the secondary coolant in the steam generator according to the setting of the pressure by the pressure adjustment means.

According to the high temperature gas cooled reactor steam generation system, since a steam average temperature at the time of heating is increased by increasing the temperature of the secondary coolant at an outlet of the steam generator, it is possible to improve the thermal efficiency of the high temperature gas cooled reactor steam generation system. That is, when the pressure of the secondary coolant in the steam generator is set to be lower than the pressure of the primary coolant in the nuclear reactor by the pressure adjustment means, it is possible to improve the thermal efficiency of the high temperature gas cooled reactor steam generation system that may be decreased by the setting.

In addition, in the high temperature gas cooled reactor steam generation system of the present invention, the temperature adjustment means may include a secondary coolant discharging unit that discharges the secondary coolant to the steam generator, and may decrease the discharging amount of the secondary coolant in the secondary coolant discharging unit.

According to the high temperature gas cooled reactor steam generation system, the outlet temperature of the secondary coolant in the steam generator can be increased according to the setting of the pressure by the pressure adjustment means.

Moreover, in the high temperature gas cooled reactor steam generation system of the present invention, the temperature adjustment means may include a primary coolant temperature variable unit that changes a temperature of the primary coolant in the nuclear reactor, and may increase the temperature of the primary coolant in the primary coolant temperature variable unit.

According to the high temperature gas cooled reactor steam generation system, the outlet temperature of the secondary coolant in the steam generator can be increased according to the setting of the pressure by the pressure adjustment means.

In addition, the high temperature gas cooled reactor steam generation system of the present invention may further include temperature control means for controlling the temperature adjustment means so that the outlet temperature of the secondary coolant is a predetermined temperature according to the set pressure of the secondary coolant based on the outlet temperature of the secondary coolant.

According to the high temperature gas cooled reactor steam generation system, based on the outlet temperature of the secondary coolant, it is possible to control the increase of the outlet temperature of the secondary coolant in the steam generator according to the setting of the pressure by the pressure adjustment means by the temperature adjustment means.

Advantageous Effects of Invention

According to the present invention, it is possible to prevent a secondary coolant in a steam generator from entering a nuclear reactor.

DESCRIPTION OF EMBODIMENTS

Hereinafter, an embodiment according to the present invention will be described in detail with reference to the drawings. In addition, the present invention is not limited to the embodiment. Moreover, components in the embodiment described below include a component that can be replaced and can be easily obtained by a person skilled in the art, or substantially the same component.

Figure 1:
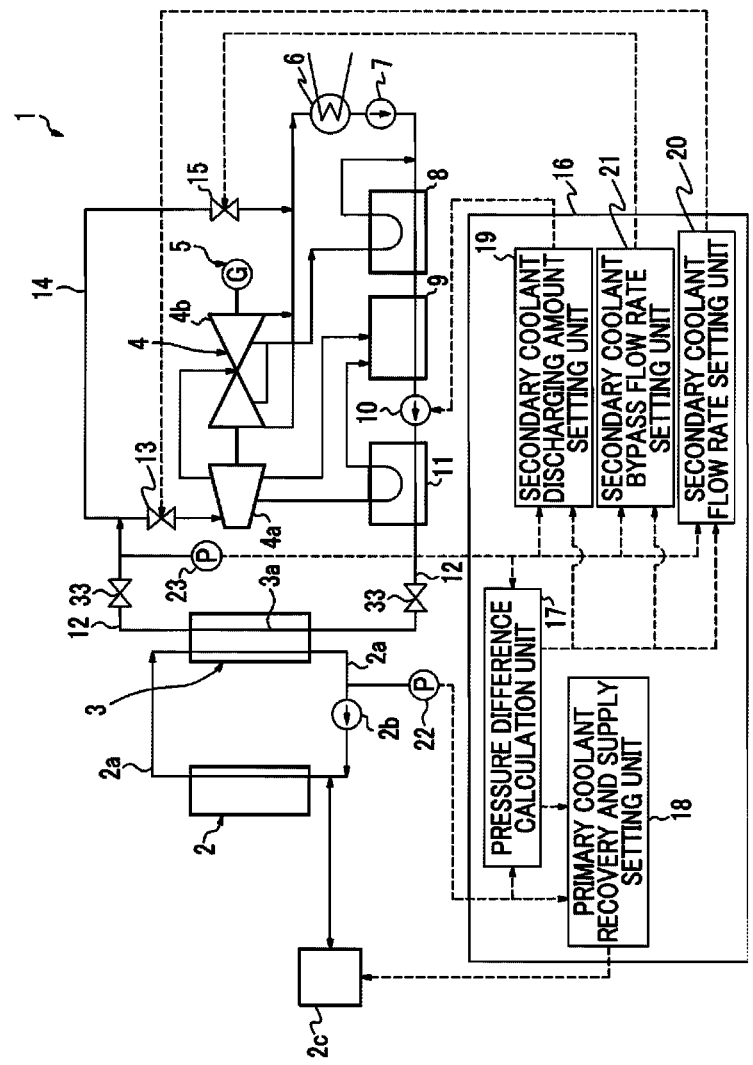
FIG. 1 is a schematic view of a high temperature gas cooled reactor steam generation system according to an embodiment of the present invention.

FIG. 1 is a schematic view of a high temperature gas cooled reactor steam generation system according to the present embodiment. As shown in FIG. 1, a high temperature gas cooled reactor steam generation system 1 mainly includes a nuclear reactor 2, a steam generator 3, a steam turbine 4, and a generator 5.

In the nuclear reactor 2, helium gas is used as a primary coolant, and the primary coolant is heated by heat that is generated by a nuclear reaction that decelerates neutrons by a graphite block. In the steam generator 3, water is used as a secondary coolant, the secondary coolant is heated by the primary coolant via the nuclear reactor 2, and thus, steam is generated. The nuclear reactor 2 and the steam generator 3 communicate with each other by a primary cooling system circuit 2*a*. In the primary cooling system circuit 2*a*, a circulation fan (primary coolant discharging unit) 2*b* is provided, which discharges the primary coolant and circulates the primary coolant to the nuclear reactor 2 and the steam generator 3. That is, the primary cooling system circuit 2*a* discharges the primary coolant by the circulation fan 2*b* and circulates the primary coolant to the nuclear reactor 2 and the steam generator 3. Moreover, in the primary cooling system circuit 2*a*, a primary coolant storage unit 2*c* is provided, which recovers or supplies the primary coolant via the primary cooling system circuit 2*a*. Moreover, a heat transfer tube 3a is provided in the inner portion of the steam generator 3. The heat transfer tube 3a is a helical coil type, and the secondary coolant flows through the inner portion of the heat transfer tube. That is, the steam generator 3 supplies heat to the secondary coolant flowing through the heat transfer tube 3a by the primary coolant that is heated by the nuclear reactor 2, and thus, steam (overheating steam) is generated.

The steam turbine 4 is operated by the steam that is supplied from the steam generator 3. The generator 5 generates electricity according to the operation of the steam turbine 4. In the present embodiment, the steam turbine 4 includes a high pressure turbine 4a and a low pressure turbine 4b, the high pressure turbine 4a is operated by the steam from the steam generator 3, and the low pressure turbine 4b is operated by the steam extracted from the high pressure turbine 4a. Moreover, the steam used in the operation of the low pressure turbine 4b is cooled to be condensed by a condenser 6, and returns to water. The returned water is discharged to a heater 8 by a condensate pump 7 that is provided at the rear step of the condenser 6. The heater 8 heats the water by the steam that is extracted from the low pressure turbine 4b. Moreover, the steam that has been used to heat the water is condensed by heat exchanging with water to become water, and the condensed water is supplied to the water of an upstream side of the heater 8. The water heated by the heater 8 is stored in a water supply tank 9. The water stored in the water supply tank 9 is discharged by a feed water pump (secondary coolant discharging unit) 10, and is supplied to the steam generator 3 via the heater 11. The heater 11 heats the water by the steam that is extracted from the high pressure turbine 4a. In addition, the steam used to heat the water is condensed by heat exchanging with water to become water, and the condensed water is supplied to the water supply tank 9. Moreover, a drain (condensed water) in the high pressure turbine 4a is also supplied to the water supply tank 9. In this way, after the steam supplied from the steam generator 3 operates the steam turbine 4, the steam is condensed to return water, and circulates a secondary cooling system circuit 12 through which the condensed water is supplied to the steam generator 3. In the secondary cooling system circuit 12, a governor valve (secondary coolant flow rate variable unit) 13, which changes a flow rate of the steam to the steam turbine 4 so that a rotational frequency of the steam turbine 4 is constant, is provided between the steam generator 3 and the steam turbine 4. Moreover, in the secondary cooling system circuit 12, a bypass circuit 14 that bypasses the steam directed to the steam turbine 4 is provided. In addition, in the bypass circuit 14, a bypass valve (secondary coolant bypass flow rate variable unit) 15 that changes the flow rate of the steam is provided.

In the high temperature gas cooled reactor steam generation system 1, if a pressure of the secondary coolant in the steam generator 3 is set to be higher than a pressure of the primary coolant in the nuclear reactor 2, when the heat transfer tube 3a of the steam generator 3 is damaged, there is a concern that high pressure water or steam which is supplied into the heat transfer tube 3a may enter the nuclear reactor 2. In this case, graphite configuring a reactor core and water react ($C+H_2O \rightarrow CO+H_2$), and there is a concern that a hydrogen explosion due to corrosion of the graphite or flammable gas may occur.

Thus, in the high temperature gas cooled reactor steam generation system 1 of the present embodiment, the secondary coolant in the steam generator 3 is prevented from entering the nuclear reactor 2. Specifically, the high temperature gas cooled reactor steam generation system 1 of the present embodiment includes pressure adjustment means for setting the pressure of the secondary coolant in the steam generator 3 to be lower than the pressure of the primary coolant in the nuclear reactor 2.

According to the high temperature gas cooled reactor steam generation system 1 of the present embodiment, since the pressure of the secondary coolant in the steam generator 3 is set to be lower than the pressure of the primary coolant in the nuclear reactor 2 by the pressure adjustment means, when the heat transfer tube 3a of the steam generator 3 is damaged, it is possible to prevent the high pressure water or steam supplied into the heat transfer tube 3a from entering the nuclear reactor 2.

Specifically, the pressure adjustment means includes at least one of the following: the primary coolant storage unit 2c, the feed water pump (secondary coolant discharging unit) 10, the governor valve (secondary coolant flow rate variable unit) 13, and the bypass valve (secondary coolant bypass flow rate variable unit) 15. Moreover, in the pressure adjustment means, the pressure of the primary coolant is increased by supplying the primary coolant to the primary coolant storage unit 2c, and thus, the pressure of the secondary coolant in the steam generator 3 is set to be lower than the pressure of the primary coolant in the nuclear reactor 2. In addition, in the pressure adjustment means, the pressure of the secondary coolant fed to the steam generator 3 is decreased by decreasing a discharging amount of the secondary coolant in the feed water pump (secondary coolant discharging unit) 10, and thus, the pressure of the secondary coolant in the steam generator 3 is set to be lower than the pressure of the primary coolant in the nuclear reactor 2. Moreover, in the pressure adjustment means, the pressure of the primary coolant at an outlet side of the steam generator 3 is decreased by increasing the flow rate of the secondary coolant fed to the steam turbine 4 in the governor valve (secondary coolant flow rate variable unit) 13, and thus, the pressure of the secondary coolant in the steam generator 3 is set to be lower than the pressure of the primary coolant in the nuclear reactor 2. In addition, in the pressure adjustment means, the pressure of the primary coolant of the outlet side of the steam generator 3 is decreased by increasing the flow rate of the secondary coolant fed to the bypass circuit 14 in the bypass valve (secondary coolant bypass flow rate variable unit) 15, and thus, the pressure of the secondary coolant in the steam generator 3 is set to be lower than the pressure of the primary coolant in the nuclear reactor 2.

As shown in FIG. 1, the high temperature gas cooled reactor steam generation system 1 of the present embodiment includes pressure control means 16 for controlling the primary coolant storage unit 2c, the feed water pump (secondary coolant discharging unit) 10, the governor valve (secondary coolant flow rate variable unit) 13, and the bypass valve (secondary coolant bypass flow rate variable unit) 15.

The pressure control means 16 includes a pressure difference calculation unit 17, and includes at least one of the following: a primary coolant recovery and supply setting unit 18, a secondary coolant discharging amount setting unit 19, a secondary coolant flow rate setting unit 20, and a secondary coolant bypass flow rate setting unit 21.

The pressure difference calculation unit 17 inputs each pressure from a primary coolant pressure detection unit 22 that detects the pressure of the primary coolant, and a secondary coolant pressure detection unit 23 that detects the pressure of the secondary coolant flowing through the heat transfer tube 3a of the steam generator 3, and calculates a difference of the pressures. Since the pressure of the secondary coolant in the steam generator 3 is set to be lower than the pressure of the primary coolant in the nuclear reactor 2, the primary coolant pressure detection unit 22 detects the pressure of the primary coolant that is relatively low at an inlet side of the circulation fan 2b. In addition, since the pressure of the secondary coolant in the steam generator 3 is set to be lower than the pressure of the primary coolant in the nuclear reactor 2, the secondary coolant pressure detection unit 23 detects the pressure of the secondary coolant that is relatively high at the outlet side of the steam generator 3. The primary coolant pressure detection unit 22 detects the pressure of the primary coolant at the inlet side of the nuclear reactor 2. Moreover, the secondary coolant pressure detection unit 23 detects the pressure of the secondary coolant at the outlet side of the steam generator 3.

In the primary coolant storage unit 2c, the primary coolant recovery and supply setting unit 18 recovers or supplies the primary coolant, sets a recovery pressure or a supply pressure of the primary coolant by a flow rate limitation mechanism (for example, ON-OFF valve control by pressure) such as an orifice, or sets a recovery amount or a supply amount of the primary coolant by a flow rate adjustment valve.

The secondary coolant discharging amount setting unit 19 sets an increase and decrease, and an increase and decrease amount of the discharging amount of the secondary coolant in the feed water pump (secondary coolant discharging unit) 10. That is, when the discharging amount of the secondary coolant is increased, the feed water pump 10 is rotated at a high speed, the increase amount is set according to the rotational frequency, and when the discharging amount of the secondary coolant is decreased, the feed water pump 10 is rotated at a low speed, and the decrease amount is set according to the rotational frequency.

The secondary coolant flow rate setting unit 20 sets an increase and decrease, and an increase and decrease amount of the flow rate of the secondary coolant in the governor valve (secondary coolant flow rate variable unit) 13. That is, when the flow rate of the secondary coolant is increased, the governor valve 13 is opened, and thus, an increase amount is set according to the opening degree, and when the flow rate of the secondary coolant is decreased, the governor valve 13 is closed, and thus, a decrease amount is set according to the opening degree.

The secondary coolant bypass flow rate setting unit sets an increase and decrease, and an increase and decrease amount of the flow rate of the secondary coolant in the bypass valve (secondary coolant bypass flow rate variable unit) 15. That is, when the flow rate of the secondary coolant is increased, the bypass valve 15 is opened, and thus, an increase amount is set according to the opening degree, and when the flow rate of the secondary coolant is decreased, the bypass valve 15 is closed, and thus, a decrease amount is set according to the opening degree.

The pressure control means 16 is configured of a microcomputer or the like, and a program or data for performing each setting at the primary coolant recovery and supply setting unit 18, the secondary coolant discharging amount setting unit 19, the secondary coolant flow rate setting unit 20, and the secondary coolant bypass flow rate setting unit 21 is stored in a storage unit (not shown) such as RAM or ROM so that a pressure difference is within a predetermined range based on the calculation of the pressure difference by the pressure difference calculation unit 17. Here, the predetermined range of the pressure difference may be any range as long as the pressure of the secondary coolant in the steam generator 3 is lower than the pressure of the primary coolant in the nuclear reactor 2, and the predetermined ranges are different according to various plants, for example, the pressure of the secondary coolant at the outlet side in the steam generator 3 is set to 5.8 [MPa] while the pressure of the primary coolant at the inlet side in the circulation fan 2b is set to 5.94 [MPa]. In addition, an upper limit of the pressure difference is also set according to various plants.

A control of the pressure adjustment means by the pressure control means 16 will be described. FIGS. 2 to 5 are flowcharts showing a control of the high temperature gas cooled reactor steam generation system shown in FIG. 1.

Figure 2:
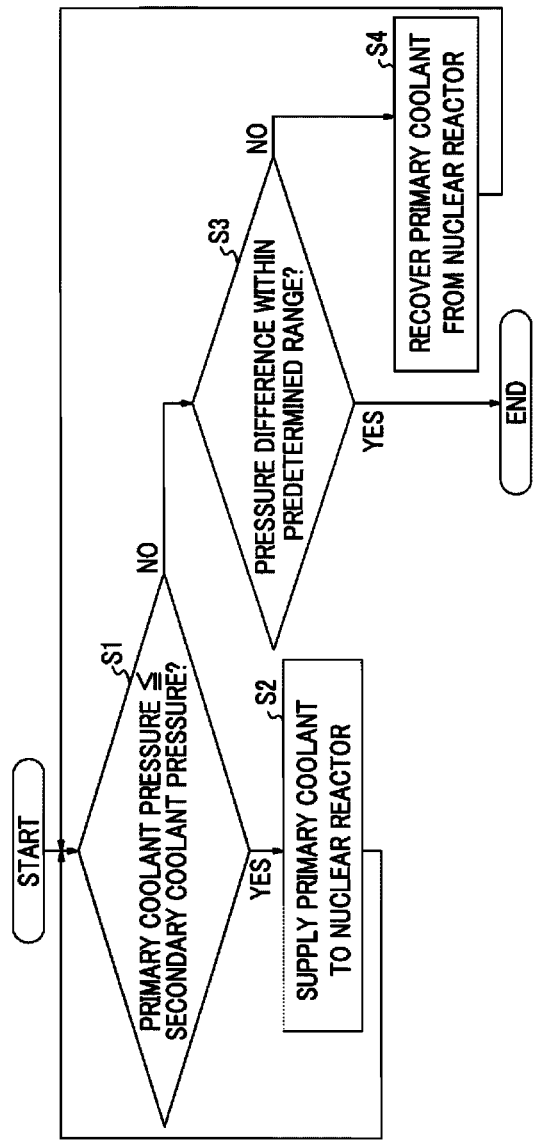
FIG. 2 is a flowchart showing a control of the high temperature gas cooled reactor steam generation system shown in FIG. 1.

As shown in FIG. 2, in a control of the primary coolant storage unit 2c which is the pressure adjustment means, based on the pressure difference between the pressure of the primary coolant and the pressure of the secondary coolant obtained from the calculation by the pressure difference calculation unit 17, when the pressure difference satisfies the primary coolant pressure≤the secondary coolant pressure (Step S1: Yes), a command by which the primary coolant recovery and supply setting unit 18 supplies the primary coolant is output to the primary coolant storage unit 2c, and the primary coolant is supplied to increase the pressure of the primary coolant (Step S2). This is performed until the primary coolant pressure>the secondary coolant pressure is satisfied in Step S1 (Step S1: No). When the primary coolant pressure>the secondary coolant pressure is satisfied in Step S1 (Step S1: No), if the pressure difference is within the predetermined range (Step S3: Yes), the control ends. Moreover, in Step S3, when the pressure difference is not within the predetermined range, that is, when the pressure difference exceeds the upper limit of the pressure difference which is set for each plant and the primary coolant pressure is too high (Step S3: No), a command by which the primary coolant recover and supply setting unit 18 recovers the primary coolant is output to the primary coolant storage unit 2c, and the primary coolant is recovered to decrease the pressure of the primary coolant (Step S4). This is performed until the primary coolant pressure>the secondary coolant pressure is satisfied (in Step S1: No) in Step 1 and the pressure difference is within the predetermined range in Step S3 (Step S3: Yes). Moreover, the control is continually performed or periodically performed.

Figure 3:
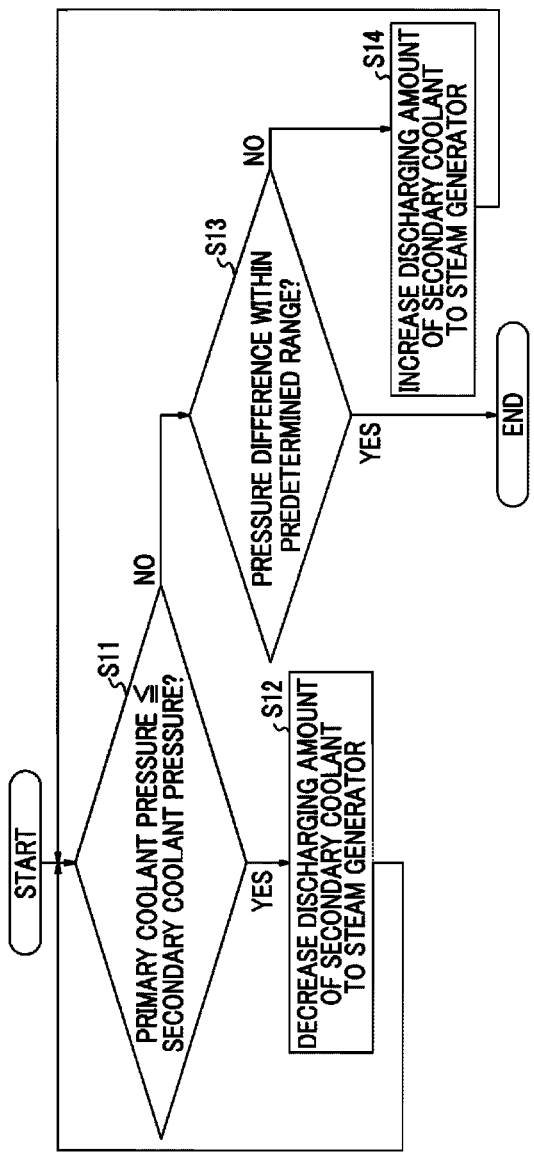
FIG. 3 is a flowchart showing the control of the high temperature gas cooled reactor steam generation system shown in FIG. 1.

As shown in FIG. 3, in a control of the feed water pump (secondary coolant discharging unit) 10 which is the pressure adjustment means, based on the pressure difference between the pressure of the primary coolant and the pressure of the secondary coolant obtained from the calculation by the pressure difference calculation unit 17, when the pressure difference satisfies the primary coolant pressure the secondary coolant pressure (Step S11: Yes), a command by which the secondary coolant discharging amount setting unit 19 decreases the discharging amount of the secondary coolant to the steam generator 3 is output to the feed water pump 10, and the discharging amount of the secondary coolant is decreased to decrease the pressure of the secondary coolant (Step S12). This is performed until the primary coolant pressure>the secondary coolant pressure is satisfied in Step S11 (Step S11: No). When the primary coolant pressure>the secondary coolant pressure is satisfied in Step S11 (Step S11: No), if the pressure difference is within the predetermined range (Step S13: Yes), the control ends. Moreover, in Step S13, when the pressure difference is not within the predetermined range, that is, when the pressure difference exceeds the upper limit of the pressure difference which is set for each plant and the secondary coolant pressure is too low (Step S13: No), a command by which the secondary coolant discharging amount setting unit 19 increases the discharging amount of the secondary coolant to the steam generator 3 is output to the feed water pump 10, and the discharging amount of the secondary coolant is increased to increase the pressure of the secondary coolant (Step S14). This is performed until the primary coolant pressure>the secondary coolant pressure is satisfied in Step S11 (Step S11: No) and the pressure difference is within the predetermined range in Step S13 (Step S13: Yes). Moreover, the control is continually performed or periodically performed.

Figure 4:
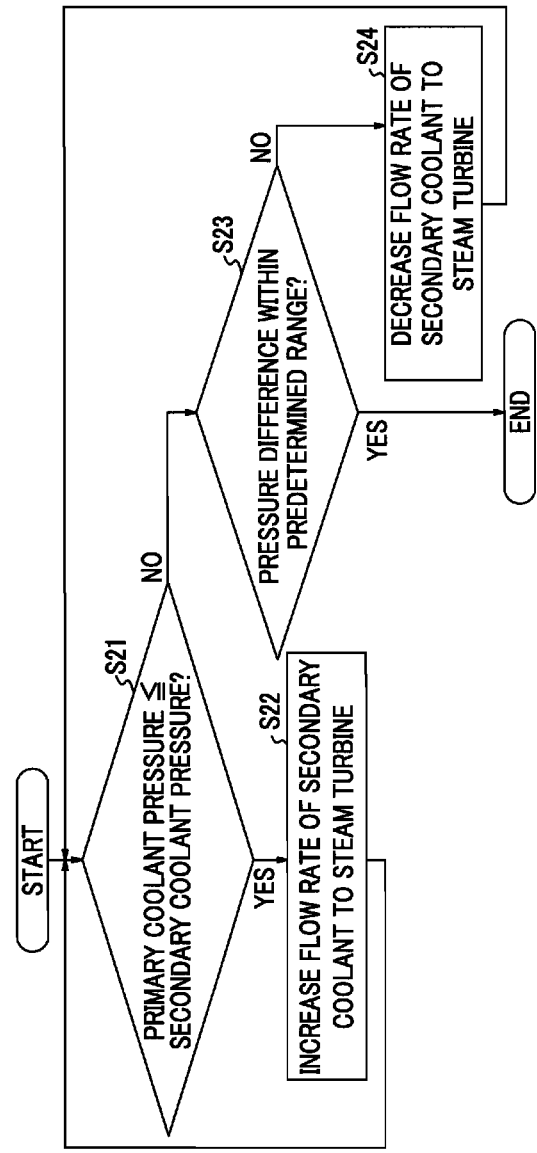
FIG. 4 is a flowchart showing the control of the high temperature gas cooled reactor steam generation system shown in FIG. 1.

As shown in FIG. 4, in a control of the governor valve (secondary coolant flow rate variable unit) 13 which is the pressure adjustment means, based on the pressure difference between the pressure of the primary coolant and the pressure of the secondary coolant obtained from the calculation by the pressure difference calculation unit 17, when the pressure difference satisfies the primary coolant pressure≤the secondary coolant pressure (Step S21: Yes), a command by which the secondary coolant flow rate setting unit 20 increases the flow rate of the secondary coolant to the steam turbine 4 is output to the governor valve 13, and the flow rate of the secondary coolant is increased to decrease the pressure of the secondary coolant (Step S22). This is performed until the primary coolant pressure>the secondary coolant pressure is satisfied in Step S21 (Step S21: No). When the primary coolant pressure>the secondary coolant pressure is satisfied in Step S21 (Step S21: No), if the pressure difference is within the predetermined range (Step S23: Yes), the control ends. Moreover, in Step S23, when the pressure difference is not within the predetermined range, that is, when the pressure difference exceeds the upper limit of the pressure difference which is set for each plant and the secondary coolant pressure is too low (Step S23: No), a command by which the secondary coolant flow rate setting unit 20 decreases the flow rate of the secondary coolant to the steam turbine 4 is output to the governor valve 13, and the flow rate of the secondary coolant is decreased to increase the pressure of the secondary coolant (Step S24). This is performed until the primary coolant pressure>the secondary coolant pressure is satisfied in Step S21 (Step S21: No) and the pressure difference is within the predetermined range in Step S23 (Step S23: Yes). Moreover, the control is continually performed or periodically performed.

Figure 5:
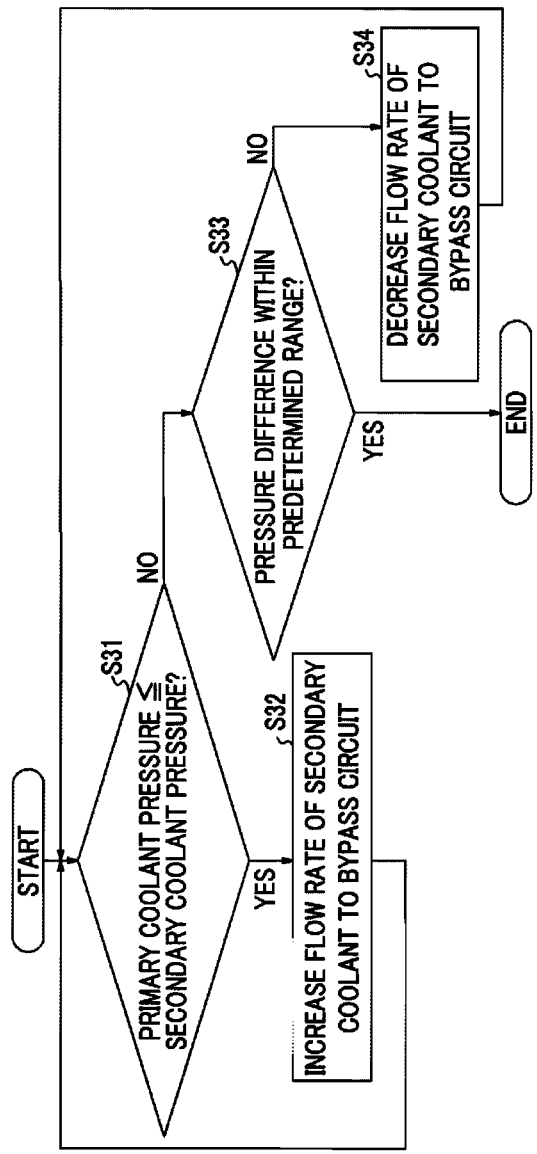
FIG. 5 is a flowchart showing the control of the high temperature gas cooled reactor steam generation system shown in FIG. 1.

As shown in FIG. 5, in a control of the bypass valve (secondary coolant bypass flow rate variable unit) 15 which is the pressure adjustment means, based on the pressure difference between the pressure of the primary coolant and the pressure of the secondary coolant obtained from the calculation by the pressure difference calculation unit 17, when the pressure difference satisfies the primary coolant pressure≤the secondary coolant pressure (Step S31: Yes), a command by which the secondary coolant bypass flow rate setting unit 21 increases the flow rate of the secondary coolant to the bypass circuit 14 is output to the bypass valve 15, and the flow rate of the secondary coolant is increased to decrease the pressure of the secondary coolant (Step S32). This is performed until the primary coolant pressure>the secondary coolant pressure is satisfied in Step S31 (Step S31: No). When the primary coolant pressure>the secondary coolant pressure is satisfied in Step S31 (Step S31: No), if the pressure difference is within the predetermined range (Step S33: Yes), the control ends. Moreover, in Step S33, when the pressure difference is not within the predetermined range, that is, when the pressure difference exceeds the upper limit of the pressure difference which is set for each plant and the secondary coolant pressure is too low (Step S33: No), a command by which the secondary coolant bypass flow rate setting unit 21 decreases the flow rate of the secondary coolant to the bypass circuit 14 is output to the bypass valve 15, and the flow rate of the secondary coolant is decreased to increase the pressure of the secondary coolant (Step S34). This is performed until the primary coolant pressure>the secondary coolant pressure is satisfied in Step S31 (Step S31: No) and the pressure difference is within the predetermined range in Step S33 (Step S33: Yes). Moreover, the control is continually performed or periodically performed.

Moreover, the above-described controls of the primary coolant storage unit 2c, the feed water pump (secondary coolant discharging unit) 10, the governor valve (secondary coolant flow rate variable unit) 13, and the bypass valve (secondary coolant bypass flow rate variable unit) 15, which are the pressure adjustment means, may be performed individually or may be performed together, and are appropriately selected according to the high temperature gas cooled reactor steam generation system 1.

In this way, the high temperature gas cooled reactor steam generation system 1 of the present embodiment includes at least one of the following, the primary coolant storage unit 2c, the feed water pump (secondary coolant discharging unit) 10, the governor valve (secondary coolant flow rate variable unit) 13, and the bypass valve (secondary coolant bypass flow rate variable unit) 15 which are the pressure adjustment means, and the pressure of the secondary coolant in the steam generator 3 can be set to be lower than the pressure of the primary coolant in the nuclear reactor 2 by the pressure adjustment means. Moreover, the pressure adjustment means can be appropriately selected according to the high temperature gas cooled reactor steam generation system 1.

In addition, the high temperature gas cooled reactor steam generation system 1 of the present embodiment includes the pressure control means 16 for controlling the pressure adjustment means so that, based on the pressure difference between the pressure of the primary coolant and the pressure of the secondary coolant, the pressure difference is within the predetermined range, and thus, based on the pressure difference between the pressure of the primary coolant and the pressure of the secondary coolant, the pressure of the secondary coolant in the steam generator 3 can be controlled to be set to be lower than the pressure of the primary coolant in the nuclear reactor 2 by the pressure adjustment means.

Then, as described above, the pressure of the secondary coolant in the steam generator 3 is set to be lower than the pressure of the primary coolant in the nuclear reactor 2, and thus, it is possible to prevent high pressure water or steam supplied into the heat transfer tube 3a from entering the nuclear reactor 2. However, if the pressure of the secondary coolant at the outlet of the steam generator 3 is decreased, a boiling temperature of the secondary coolant is decreased, a steam average temperature is decreased when the secondary coolant is heated, and thus, thermal efficiency of the high temperature gas cooled reactor steam generation system 1 may be deteriorated. In addition, since the pressure of the primary coolant in the nuclear reactor 2 is integrally set according to the setting of the pressure by the pressure adjustment means, from the viewpoint that the pressure of the secondary coolant should be lower than the pressure of the primary coolant, as a measure for improving the thermal efficiency of the high temperature gas cooled reactor steam generation system 1, there is a limitation in an increase of the pressure of the secondary coolant at the outlet of the steam generator 3.

Accordingly, the high temperature gas cooled reactor steam generation system 1 of the present embodiment includes temperature adjustment means for increasing an outlet temperature of the secondary coolant in the steam generator 3 according to the setting of the pressure by the pressure adjustment means.

According to the high temperature gas cooled reactor steam generation system 1, since the steam average temperature at the time of heating is increased by increasing the temperature of the secondary coolant at the outlet of the steam generator 3, it is possible to improve the thermal efficiency of the high temperature gas cooled reactor steam generation system 1. That is, when the pressure of the secondary coolant in the steam generator 3 is set to be lower than the pressure of the primary coolant in the nuclear reactor 2, it is possible to improve the thermal efficiency of the high temperature gas cooled reactor steam generation system 1 which may be deteriorated by the setting.

Figure 6:
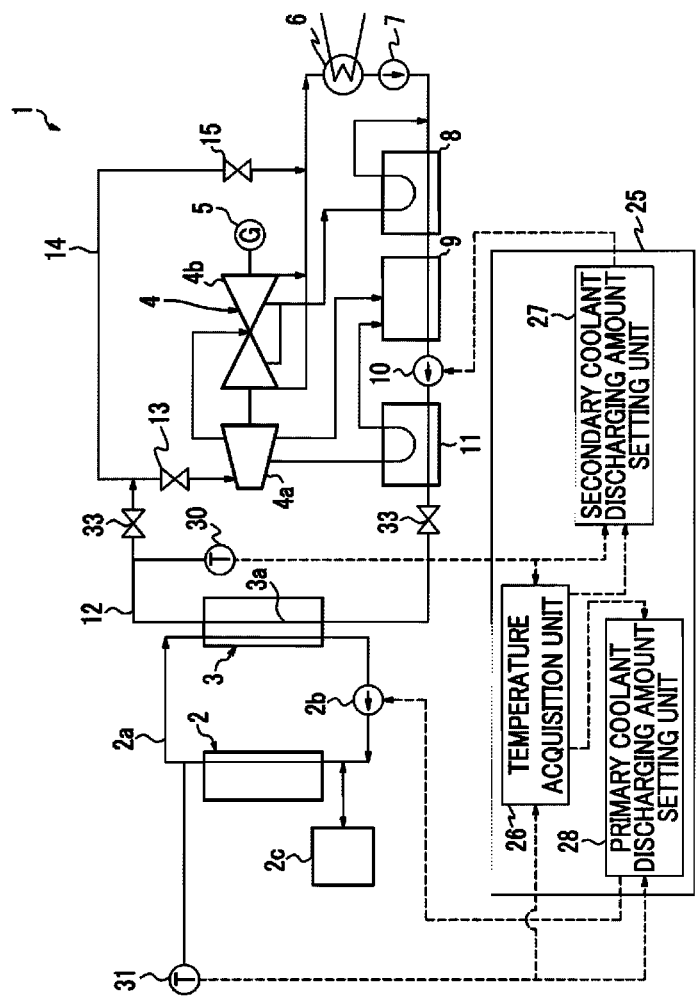
FIG. 6 is a schematic diagram of another high temperature gas cooled reactor steam generation system according to an embodiment of the present invention.

FIG. 6 is a schematic diagram of a high temperature gas cooled reactor steam generation system including the temperature adjustment means in another high temperature gas cooled reactor steam generation system according to the present embodiment. Moreover, in FIG. 6, the same reference numerals are assigned to the same part as the configurations shown in FIG. 1, and the descriptions thereof can be omitted.

As shown in FIG. 6, the temperature adjustment means includes at least one of the following: the feed water pump (secondary coolant discharging unit) 10, the circulation fan (primary coolant discharging unit) 2b which is a primary coolant temperature variable unit, and the nuclear reactor 2 which is the primary coolant temperature variable unit. Moreover, the temperature adjustment means decreases the generated steam amount by decreasing the discharging amount of the secondary coolant in the feed water pump (secondary coolant discharging unit) 10, and increases the outlet temperature of the secondary coolant in the steam generator 3. Moreover, the temperature adjustment means decreases the primary coolant heated by the nuclear reactor 2 by decreasing the discharging amount of the primary coolant in the circulation fan (primary coolant discharging unit) 2b, increases the outlet temperature of the primary coolant in the nuclear reactor 2, and increases the outlet temperature of the secondary coolant heated by the primary coolant.

As shown in FIG. 6, the high temperature gas cooled reactor steam generation system 1 of the present embodiment includes temperature control means 25 for controlling the feed water pump (secondary coolant discharging unit) 10, the circulation fan (primary coolant discharging unit) 2b, and the nuclear reactor 2.

The temperature control means 25 includes a temperature acquirement unit 26, and includes at least one of a secondary coolant discharging amount setting unit 27 and a primary coolant discharging amount setting unit 28.

The temperature acquirement unit 26 inputs the outlet temperature of the secondary coolant from a secondary coolant temperature detection unit 30 which detects the outlet temperature of the secondary coolant of the steam generator 3. Moreover, since the temperature of the primary coolant having a relatively high temperature is detected at the outlet side of the nuclear reactor 2, a primary coolant temperature detection unit 31 is provided. The temperature acquirement unit 26 inputs the outlet temperature of the primary coolant from the primary coolant temperature detection unit 31.

The secondary coolant discharging amount setting unit 27 sets an increase and decrease, and an increase and decrease amount of the discharging amount of the secondary coolant in the feed water pump (secondary coolant discharging unit) 10. That is, when the discharging amount of the secondary coolant is increased, the feed water pump 10 is rotated at a high speed, the increase amount is set according to the rotational frequency, and when the discharging amount of the secondary coolant is decreased, the feed water pump 10 is rotated at a low speed, and the decrease amount is set according to the rotational frequency.

The primary coolant discharging amount setting unit sets an increase and decrease, and an increase and decrease amount of the discharging amount of the primary coolant in the circulation fan (primary coolant discharging unit) 2b. That is, when the discharging amount of the primary coolant is increased, the circulation fan 2b is rotated at a high speed, the increase amount is set according to the rotational frequency, and when the discharging amount of the primary coolant is decreased, the circulation fan 2b is rotated at a low speed, and the decrease amount is set according to the rotational frequency.

The temperature control means 25 is configured of a microcomputer or the like, and a program or data for performing each setting at the secondary coolant discharging amount setting unit 27 and the primary coolant discharging amount setting unit 28 is stored in a storage unit (not shown) such as RAM or ROM so that the temperature is within a predetermined temperature based on the outlet temperature of the secondary coolant by the temperature acquirement unit 26. Here, the predetermined temperature is set based on the same temperature (although the predetermined temperatures are different according to various plants, for example, 550 [° C.]) as the outlet temperature of the secondary coolant before the pressure is set by the pressure adjustment means, and the range of the predetermined temperature is also set for each of the various plants.

Figure 7:
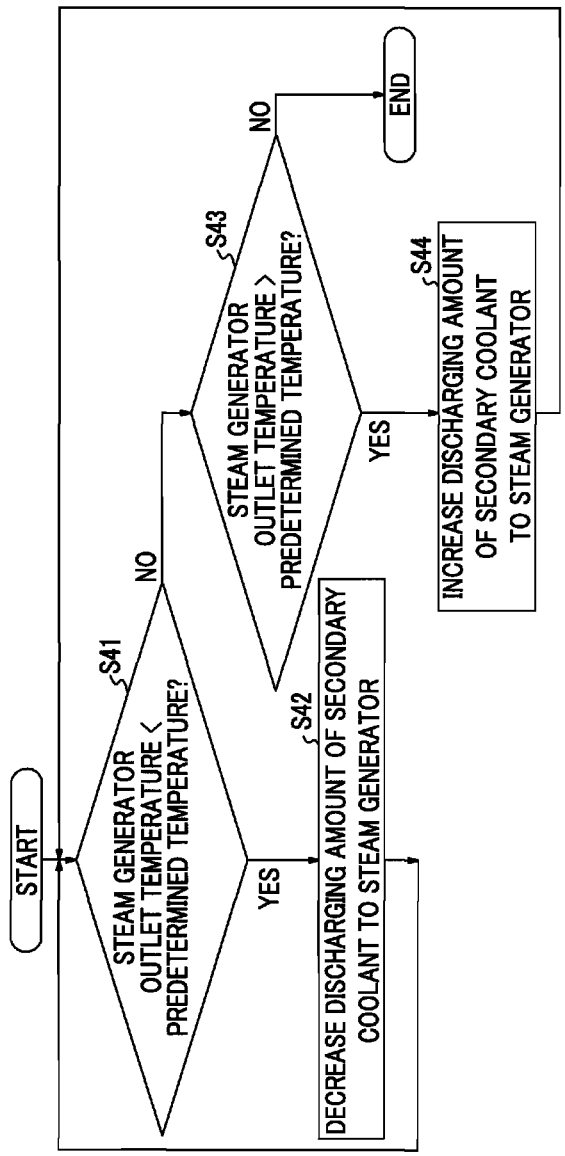
FIG. 7 is a flowchart showing a control of the high temperature gas cooled reactor steam generation system shown in FIG. 6.
Figure 8:
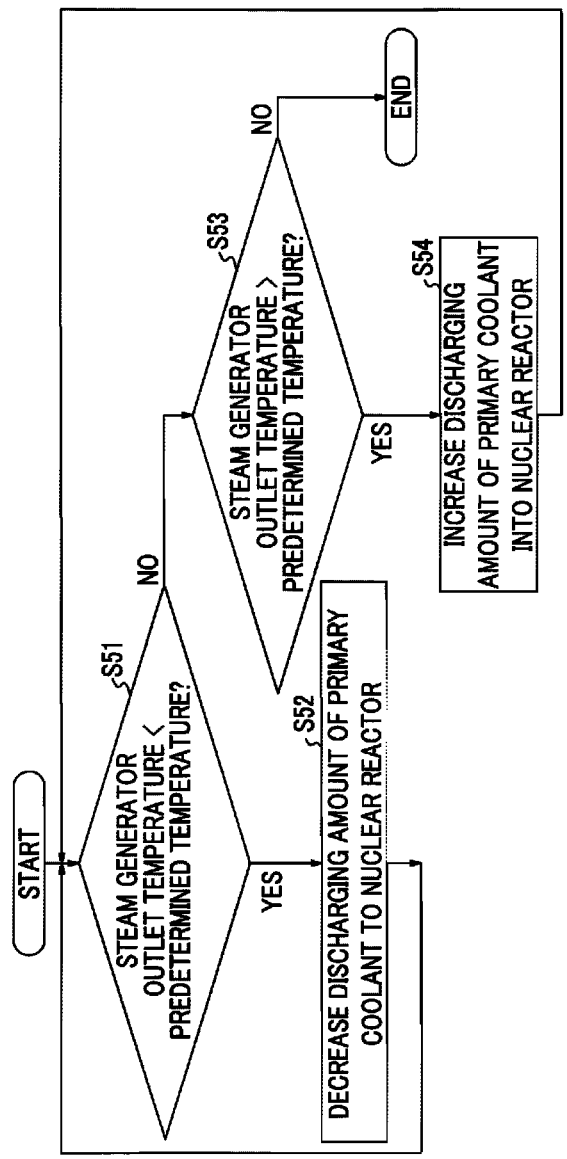
FIG. 8 is a flowchart showing the control of the high temperature gas cooled reactor steam generation system shown in FIG. 6.

A control of the temperature adjustment means by the temperature control means 25 will be described. FIGS. 7 and 8 are flowcharts showing the control of the high temperature gas cooled reactor steam generation system shown in FIG. 6.

As shown in FIG. 7, in a control of the feed water pump (secondary coolant discharging unit) 10 which is the temperature adjustment means, based on the outlet temperature of the secondary coolant which is obtained by the temperature acquirement unit 26, when the outlet temperature<the predetermined temperature is satisfied (Step S41: Yes), a command by which the secondary coolant discharging amount setting unit 27 decreases the discharging amount of the secondary coolant to the steam generator 3 is output to the feed water pump 10, and the discharging amount of the secondary coolant is decreased to increase the outlet temperature of the secondary coolant (Step S42). This is performed until the outlet temperature≥the predetermined temperature is satisfied in Step S41 (Step S41: No). When the outlet temperature the predetermined temperature is satisfied in Step S41 (Step S41: No), if the outlet temperature=the predetermined temperature is satisfied (Step S43: No), the control ends. Moreover, in Step S41, when the outlet temperature≥the predetermined temperature is satisfied (Step S41: No) and the outlet temperature>the predetermined temperature is satisfied (Step S43: Yes), that is, when the outlet temperature exceeds the predetermined temperature which is set for each plant and the outlet temperature of the secondary coolant is too high, a command by which the secondary coolant discharging amount setting unit 27 increases the discharging amount of the secondary coolant to the steam generator 3 is output to the feed water pump 10, and the discharging amount of the secondary coolant is increased to decrease the outlet temperature of the secondary coolant (Step S44). This is performed until the outlet temperature the predetermined temperature is satisfied in Step S41 (Step S41: No) and the outlet temperature=the predetermined temperature is satisfied in Step S43 (Step S43: No). Moreover, the control is continually performed or periodically performed.

As shown in FIG. 8, in a control of the circulation fan (primary coolant discharging unit) 2b which is the primary coolant temperature variable unit of the temperature adjustment means, based on the outlet temperature of the secondary coolant which is obtained by the temperature acquirement unit 26, when the outlet temperature<the predetermined temperature is satisfied (Step S51: Yes), a command by which the primary coolant discharging amount setting unit 28 decreases the discharging amount of the primary coolant to the nuclear reactor 2 is output to the circulation fan 2b, and the discharging amount of the primary coolant is decreased to increase the outlet temperature of the primary coolant (Step S52). This is performed until the outlet temperature≥the predetermined temperature is satisfied in Step S51 (Step S51: No). When the outlet temperature the predetermined temperature is satisfied in Step S51 (Step S51: No), if the outlet temperature=the predetermined temperature is satisfied (Step S53: No), the control ends. Moreover, in Step S51, when the outlet temperature≥the predetermined temperature is satisfied (Step S51: No) and the outlet temperature>the predetermined temperature is satisfied (Step S53: Yes), that is, when the outlet temperature exceeds the predetermined temperature which is set for each plant and the outlet temperature of the secondary coolant is too high, a command by which the primary coolant discharging amount setting unit 28 increases the discharging amount of the primary coolant to the nuclear reactor 2 is output to the circulation fan 2b, and the discharging amount of the primary coolant is increased to increase the outlet temperature of the primary coolant (Step S54). This is performed until the outlet temperature-≥the predetermined temperature is satisfied in Step S51 (Step S51: No) and the outlet temperature=the predetermined temperature is satisfied in Step S53 (Step S53: No). Moreover, the control is continually performed or periodically performed.

Moreover, the above-described controls of the feed water pump (secondary coolant discharging unit) 10, the circulation fan (primary coolant discharging unit) 2b, and the nuclear reactor 2, which are the temperature adjustment means, may be performed individually or may be performed together, and are appropriately selected according to the high temperature gas cooled reactor steam generation system 1.

In this way, the high temperature gas cooled reactor steam generation system 1 of the present embodiment includes at least one of the following, the feed water pump (secondary coolant discharging unit) 10, the circulation fan (primary coolant discharging unit) 2b as the primary coolant temperature variable unit, and the nuclear reactor 2 as the primary coolant temperature variable unit, which are the temperature adjustment means, and the outlet temperature of the secondary coolant in the steam generator 3 can be increased according to the setting of the pressure by the pressure adjustment means by the temperature adjustment means. Moreover, the temperature adjustment means can be appropriately selected according to the high temperature gas cooled reactor steam generation system 1.

In addition, the high temperature gas cooled reactor steam generation system 1 of the present embodiment includes the temperature control means for controlling the temperature adjustment means so that the outlet temperature is within the predetermined temperature according to the set pressure of the secondary coolant based on the outlet temperature of the secondary coolant, and thus, based on the outlet temperature of the secondary coolant, it is possible to control to increase the outlet temperature of the secondary coolant in the steam generator 3 according to the setting of the pressure by the pressure adjustment means by the temperature adjustment means.

Then, in the high temperature gas cooled reactor steam generation system 1, the pressure difference is set so that the primary coolant pressure<the secondary coolant pressure is satisfied until stable power output is obtained. Moreover, the setting of the pressure by the pressure adjustment means is performed after the power output is stably performed in the high temperature gas cooled reactor steam generation system 1. Accordingly, in the adjustment of the temperature by the temperature adjustment means, the temperature of the secondary coolant at the outlet of the steam generator 3 is increased to the same temperature as the temperature before the pressure is set by the pressure adjustment means.

In addition, if the pressure of the secondary coolant in the steam generator 3 is set to be lower than the pressure of the primary coolant in the nuclear reactor 2, when the heat transfer tube 3a of the steam generator 3 is damaged, it is assumed that the primary coolant of the primary cooling system circuit 2a enters the heat transfer tube 3a of the steam generator 3 and reaches the secondary cooling system circuit 12. In order to solve the problems, as shown in FIGS. 1 and 6, on-off valves 33 are provided at the upstream side and the downstream side of the steam generator 3 of the secondary cooling system circuit 12, and for example, the decrease in the pressure of the secondary coolant of the steam generator 3 is detected, and thus, when it is determined that the heat transfer tube 3a of the steam generator 3 is damaged, the on-off valves 33 may be closed.

REFERENCE SIGNS LIST

1: high temperature gas cooled reactor steam generation system
2: nuclear reactor (primary coolant temperature variable unit)
2a: primary cooling system circuit
2b: circulation fan (primary coolant discharging unit, primary coolant temperature variable unit)
2c: primary coolant storage unit
3: steam generator
3a: heat transfer tube
4: steam turbine
5: generator
10: feed water pump (secondary coolant discharging unit)
12: secondary cooling system circuit
13: governor valve (secondary coolant flow rate variable unit)
14: bypass circuit
15: bypass valve (secondary coolant bypass flow rate variable unit)
16: pressure control means
17: pressure difference calculation unit
18: primary coolant recovery and supply setting unit
19: secondary coolant discharging amount setting unit 20: secondary coolant flow rate setting unit
21: secondary coolant bypass flow rate setting unit
22: primary coolant pressure detection unit
23: secondary coolant pressure detection unit
25: temperature control means
26: temperature acquirement unit
27: secondary coolant discharging amount setting unit
28: primary coolant discharging amount setting unit
30: secondary coolant temperature detection unit
31: primary coolant temperature detection unit

The invention claimed is:

1. A high temperature gas cooled reactor steam generation system comprising:
a nuclear reactor that has helium gas as a primary coolant and heats the primary coolant by heat generated by a nuclear reaction that decelerates neutrons by a graphite block;
a steam generator that has water as a secondary coolant and heats the secondary coolant by the primary coolant via the nuclear reactor to generate steam;
a primary coolant discharging unit that circulates the primary coolant between the nuclear reactor and the steam generator;
a steam turbine that is operated by the steam from the steam generator; a generator that generates electricity according to an operation of the steam turbine;
pressure control means including a pressure difference calculation unit that includes a primary coolant pressure detection unit disposed at an inlet of the primary coolant discharging unit and configured to detect a pressure of the primary coolant and a secondary coolant pressure detection unit disposed at an outlet of the steam generator and configured to detect a pressure of the secondary coolant and to calculate a pressure difference between the primary coolant and the secondary coolant based on the detected pressures; and
pressure adjustment means including a primary coolant storage unit configured to store the helium gas therein and configured to set a pressure of the secondary coolant in the steam generator to be lower than a pressure of the primary coolant in the nuclear reactor based on the pressure difference and a primary coolant recovery and supply setting unit configured to control the primary coolant storage unit to recover or supply the primary coolant based on the pressure difference calculated in the pressure difference calculation unit.

2. The high temperature gas cooled reactor steam generation system according to claim 1, wherein the pressure adjustment means includes a secondary coolant discharging unit including a feed water pump configured to discharge the secondary coolant to the steam generator, and to decrease a discharging amount of the secondary coolant in the secondary coolant discharging unit by decreasing a rotation speed of the feed water pump based on the pressure difference between the primary coolant and the secondary coolant calculated by the pressure difference calculation unit.

3. The high temperature gas cooled reactor steam generation system according to claim 2, wherein the pressure adjustment means includes a secondary coolant flow rate variable unit configured to increase a flow rate of the secondary coolant fed to the steam turbine.

4. The high temperature gas cooled reactor steam generation system according to claim 2, wherein the pressure adjustment means includes a secondary coolant bypass flow rate variable provided at a bypass circuit bypassing the secondary coolant to the steam turbine and configured to change the flow rate of the secondary coolant, and to increase the flow rate of the secondary coolant fed to the bypass circuit.

5. The high temperature gas cooled reactor steam generation system according to claim 1, wherein the pressure adjustment means includes a secondary coolant flow rate variable configured to increase a flow rate of the secondary coolant fed to the steam turbine.

6. The high temperature gas cooled reactor steam generation system according to claim 5, wherein the pressure adjustment means includes a secondary coolant bypass flow rate variable unit provided at a bypass circuit bypassing the secondary coolant to the steam turbine and configured to change the flow rate of the secondary coolant, and to increase the flow rate of the secondary coolant fed to the bypass circuit.

7. The high temperature gas cooled reactor steam generation system according to claim 1, wherein the pressure adjustment means includes a secondary coolant bypass flow rate variable unit provided at a bypass circuit bypassing the secondary coolant to the steam turbine and configured to change the flow rate of the secondary coolant, and to increase the flow rate of the secondary coolant fed to the bypass circuit.

8. The high temperature gas cooled reactor steam generation system according to claim 1, further comprising: temperature adjustment means configured to increase an outlet temperature of the secondary coolant in the steam generator according to the setting of the pressure by the pressure adjustment means.

9. The high temperature gas cooled reactor steam generation system according to claim 8, wherein the pressure adjustment means includes a secondary coolant discharging unit including a feed water pump configured to discharge the secondary coolant to the steam generator, and to decrease a discharging amount of the secondary coolant in the secondary coolant discharging unit by decreasing a rotation speed of the feed water pump based on the pressure difference between the primary coolant and the secondary coolant calculated by the pressure difference calculation unit.

10. The high temperature gas cooled reactor steam generation system according to claim 8, wherein the temperature adjustment means includes a primary coolant temperature variable unit configured to increase a temperature of the primary coolant in the nuclear reactor.

11. The high temperature gas cooled reactor steam generation system according to claim 8, further comprising: temperature control means configured to control the temperature adjustment means so that the outlet temperature of the secondary coolant is a predetermined temperature according to the set pressure of the secondary coolant.

* * * * *